United States Patent [19]
Fringeli et al.

[11] Patent Number: 5,076,968
[45] Date of Patent: Dec. 31, 1991

[54] AQUEOUS STORAGE-STABLE WHITENER FORMULATION WITH AN ANIONIC POLYSACCHARIDE STABILIZER

[75] Inventors: Werner Fringeli, Laufen; Josef Zelger, Riehen, both of Switzerland

[73] Assignee: Ciba-Geigy Corporation, Ardsley, N.Y.

[21] Appl. No.: 485,695

[22] Filed: Feb. 27, 1990

[30] Foreign Application Priority Data

Feb. 28, 1989 [CH] Switzerland ........................ 733/89

[51] Int. Cl.[5] ........................ C11D 3/42; C09K 11/06

[52] U.S. Cl. ............................ 252/543; 252/301.23; 252/301.34

[58] Field of Search .................... 252/301.23, 301.34, 252/543

[56] References Cited

U.S. PATENT DOCUMENTS

| | | | |
|---|---|---|---|
| 3,954,740 | 5/1976 | Fringeli | 260/240 B |
| 3,962,115 | 6/1976 | Clark | 252/301.23 |
| 4,713,081 | 12/1987 | Becker | 8/527 |
| 4,888,128 | 12/1989 | Koll | 252/301.23 |

*Primary Examiner*—Prince Willis, Jr.
*Assistant Examiner*—Thomas Steinberg
*Attorney, Agent, or Firm*—George R. Dohmann; Edward McC. Roberts

[57] ABSTRACT

Storage-stable formulations which contain an anionic fluorescent whitening agent which preferably contains at least one sulfonic acid radical, in a amount of 10–60% by weight, based on the total weight of said formulation, an anionic polysaccharide and water, as well as optional auxiliaries, and the use of these formulations for the preparation of detergent compositions.

19 Claims, No Drawings

AQUEOUS STORAGE-STABLE WHITENER FORMULATION WITH AN ANIONIC POLYSACCHARIDE STABILIZER

The present invention relates to storage-stable, concentrated aqueous whitener formulations and to a process for their preparation and to the use thereof.

At the present time fluorescent whitening agents are preferably marketed in the form of aqueous solutions. Such formulations are prepared by suspending the moist filter cake or also the dry powder of the fluorescent whitening agent in water. Dispersants and thickeners are added to the resultant suspension to increase homogeneity, wettability and stability. Besides these auxiliaries, an electrolyte is frequently also added. However, the auxiliaries which have been used up to now have not been able to prevent sedimentation of the fluorescent whitening agent during prolonged storage.

Surprisingly, it has now been found that storage-stable, concentrated aqueous whitener formulations are obtained by adding to the aqueous suspension of the fluorescent whitening agent minor amounts of an anionic polysaccharide. The suspensions so obtained form hardly any deposits during storage. In addition to the good sedimentation properties, the suspensions remain homogeneous during storage.

The formulations of this invention comprise a) 10 to 60% by weight, based on the total weight of the whitener formulation, of an anionic fluorescent whitening agent, b) 0.01 to 1% by weight, based on the total weight of the whitener formulation, of an anionic polysaccharide, and c) water; as well as d) optional auxiliaries.

These formulations are in the form of suspensions.

Preferably, such formulations contain anionic fluorescent whitening agents which contain at least one sulfonic acid radical.

The fluorescent whitening agents are, for example, those of the triazine series of formula (I)

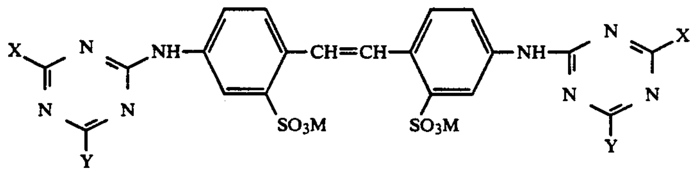

wherein X and Y may be identical or different and are a secondary or tertiary amino group or a mono- or disubstituted alkoxy group, and M is a hydrogen atom or a salt-forming cation.

Particularly interesting fluorescent whitening agents are those of formula (II)

a) 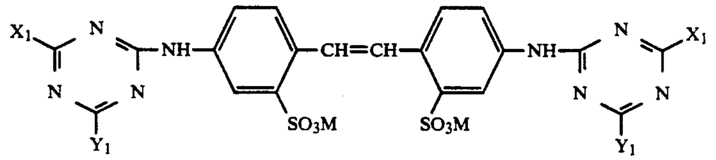

wherein $X_1$ and $Y_1$, which may be identical or different, are a phenylamino group which may be substituted by one or two $C_1$–$C_2$alkyl groups, the morpholino group, a $C_1$–$C_4$alkylamino group which may be substituted by hydroxyl groups, a $C_1$–$C_4$alkoxy group, and M is hydrogen or a salt-forming cation;

(III)

b) 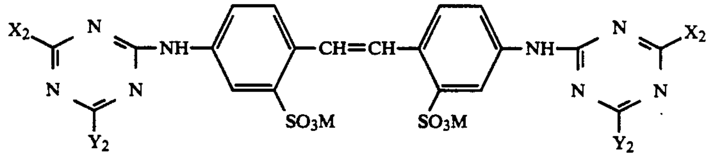

wherein wherein $X_2$ and $Y_2$, which may be identical or different, are a phenylamino group, the morpholino group, a $C_1$–$C_4$alkylamino group which may be substituted by hydroxyl groups, and M is hydrogen or a salt-forming cation;

(IV)

c) 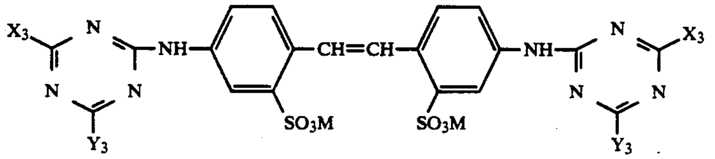

wherein $X_3$ and $Y_3$, which may be identical or different, are a phenylamino group, a morpholino group, the N-methyl-N-ethanolamino group, and M is hydrogen or a salt-forming cation;

d) 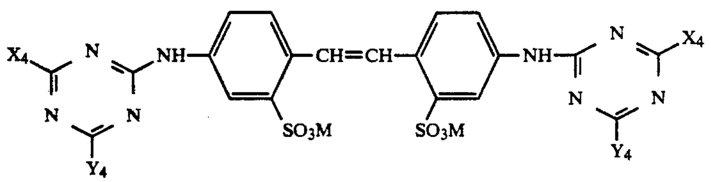
(V)

wherein $X_4$ and $Y_4$, which may be identical or different, are the morpholino group or the N-methyl-N-ethanolamino group, and M is hydrogen or a salt-forming cation;

e) 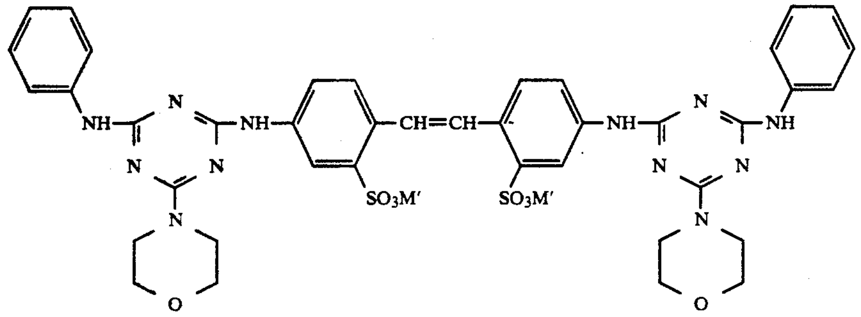
(VI)

wherein M' is an alkali metal ion, with the proviso that in the case of the fluorescent whitening agent of formula (VI) the formulation contains 4 to 25% by weight, based on the total weight of the suspension, of strong electrolytes.

It is also possible to use fluorescent whitening agents of the distilbene series, for example compounds of formula

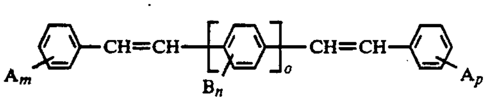
(X)

wherein A is a sulfonic acid radical, hydrogen, $C_1$–$C_4$alkyl, $C_1$–$C_4$alkoxy, or halogen, and B is hydrogen, $C_1$–$C_4$alkyl, $C_1$–$C_4$alkoxy or halogen, with the proviso that at least one substituent A is a sulfonic acid radical and m, n, o, and p are each independently of one another 1 or 2.

Preferred compounds are those in which o is 2.

Especially preferred compounds are those of formula

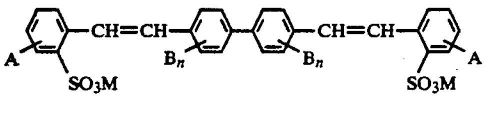
(XI)

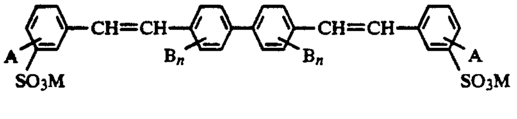
(XII)

wherein A, B and n are as defined above and M is a salt-forming cation.

Among these compounds, preferred compounds are those of formulae

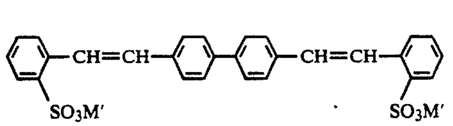
(XIII)

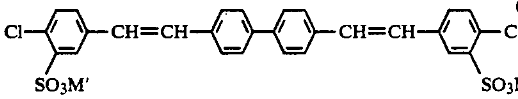
(XIV)

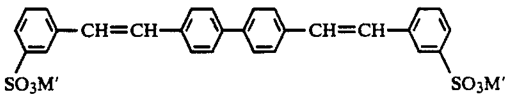
(XVI)

wherein M' is an alkali metal ion.

Suitable halogens are preferably fluoro, chloro and bromo. Chloro is especially preferred.

Suitable $C_1$–$C_4$alkyl radicals are unbranched and branched alkyl radicals such as methyl, ethyl, n- and isopropyl, n-, sec- and tert-butyl. These $C_1$–$C_4$alkyl radicals may themselves be substituted by, for example, aryl (phenyl or naphthyl), $C_1$–$C_4$alkyl, $C_1$–$C_4$alkoxy, —OH or CN groups.

Illustrative of salt-forming cations M are alkali metal ions, ammonium ions or amine salt ions. Preferred amine salt ions are those of formula $H^+NR_8R_9R_{10}$, wherein $R_8$, $R_9$ and $R_{10}$ are each independently of one another hydrogen, alkyl, alkenyl, hydroxyalkyl, cyanoalkyl, haloalkyl or phenylalkyl, or wherein $R_8$ and $R_9$, when taken together, complete a 5- to 7-membered saturated nitrogen-containing heterocycle which may additionally contain a nitrogen or oxygen atom as ring member, for example a piperidine, piperazine, pyrrolidine, imidazoline or morpholine ring, and $R_{10}$ is hydrogen.

Preferred distyrylbiphenyl compounds of formula (X) are those in which the cation M is an alkali metal ion, an ammonium ion or an amine ion, sodium and potassium being especially preferred for practical reasons.

The eligible anionic polysaccharides belong to the group of the modified polysaccharides which can be derived from cellulose. They may be etherified cellulose, but also heteropolysaccharides which contain in the side chains further monosaccharides such as mannose and glucuronic acid.

The anionic polysachcharide is, for example, sodium carboxymethyl cellulose and, most preferably, xanthane.

The amount of polysaccharide is preferably from 0.01 to 1% by weight, most preferably from 0.05 to 0.5% by weight, based on the total weight of the formulation. However, these ranges may be exceeded in the preparation of very highly concentrated formulations or formulations of very low concentration.

The formulation may contain auxiliaries, for example electrolytes, preservatives such as chloroacetamide or aqueous formaldehyde solution, and fragrances.

The electrolyte may be sodium chloride, sodium sulfate, sodium carbonate or one of the corresponding potassium salts, or also a mixture of these substances. The amount of electrolyte may be from 0.1 to 25% by weight, based on the total weight of the formulation, preferably from 0.1 to 20% by weight.

The formulations of this invention are prepared by mixing the moist filter cake or also the dry powder of an anionic fluorescent whitening agent which preferably contains at least one sulfonic acid radical, in an amount of 10–60% by weight, based on the total weight of the Accordingly, the present invention also relates to a process for the preparation of a detergent composition and to the detergent composition so obtained, which comprises mixing a suspension of surfactants customarily employed for detergents with a whitener suspension of this invention and drying the formulation so obtained. The resultant suspensions are conveniently dried by subjecting them to spray drying.

The whitener formulation of this invention can also be used for the preparation of liquid detergent compositions.

The invention is illustrated by the following non-limitative Examples in which parts are by weight.

EXAMPLE 1

| | |
|---|---|
| 0.075 | part of xanthane |
| 0.2 | part of chloroacetamide |
| 1.3 | parts of sodium sulfate, and |
| 5 | parts of sodium chloride |
| | are dissolved in |
| 61 | parts of water. |

To this solution are added, with stirring 32.5 parts of moist filter cake containing 12 parts of water, 0.5 part of sodium chloride and 20 parts of the fluorescent whitening agent of formula

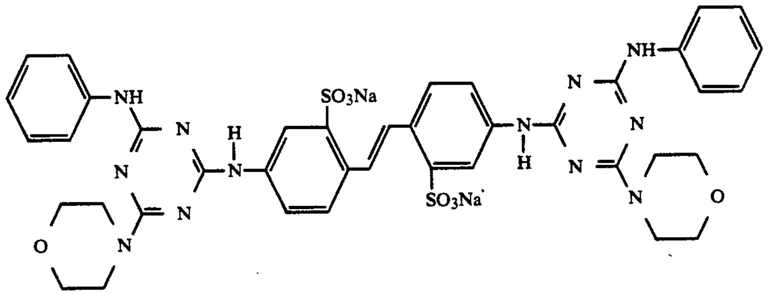

(100)

formulation, with 0.01–1% by weight of an anionic polysaccharide and water, and homogenising the formulations.

The desired content of anionic fluorescent whitening agent in the suspension can be adjusted either by addition of water, aqueous electrolyte, suspension or further dry powder to the moist filter cake. This adjustment can be made before, during or after addition of the anionic polysaccaride. The amount of anionic fluorescent whitening agent is conveniently 10 to 60% by weight, preferably 15 to 40% by weight, based on the weight of the suspension.

The suspension is then mixed with the anionic polysaccharide until it is homogeneous.

The formulation can be incorporated into a detergent composition, for example by introducing the required amount of suspension from a container into a mixing device which contains a suspension of the detergent composition or surfactant.

and the formulation is homogenised.

The whitener formulation has a viscosity of 108 cP (Haake VT 18, MVII, 22° C., $D=42\ sec^{-1}$) and forms no deposits after standing for two months at −5° C., at room temperature, and 40° C.

EXAMPLE 2

As in Example 1,

| | |
|---|---|
| 0.075 | part of xanthane |
| 0.2 | part of chloroacetamide |
| 1.3 | parts of sodium sulfate, and |
| 5 | parts of sodium chloride |
| | are dissolved in |
| 72 | parts of water. |

To this solution are added, with stirring, 21.5 parts of moist filter cake containing 1.5 parts of water and 20 parts of the fluorescent whitening agent of formula (200)

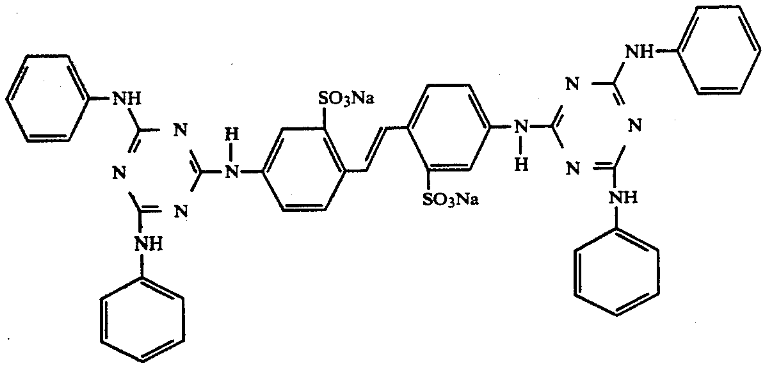

and the formulation is homogenised with stirring.

The properties of the formulation correspond to those of the formulation of Example 1.

EXAMPLE 3

As in Example 1,

| | |
|---|---|
| 0.1 | part of chloroacetamide |
| 3.0 | parts of sodium chloride |
| 1.0 | part of tallow fatty alcohol (11 mol of ethylene oxide), and |
| 0.3 | part of xanthane |
| | are dissolved in |
| 37.5 | parts of water |

To this solution are added, with stirring, 58.1 parts of moist filter cake containing 56 parts of water and 44 parts of the fluorescent whitening agent of formula (300)

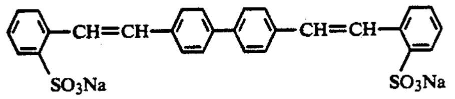

and the formulation is homogenised with stirring.

The formulation forms no deposits after standing for several months at room temperature and at 40° C.

EXAMPLE 4

As in Example 3,

| | |
|---|---|
| 0.1 | part of chloroacetamide |
| 0.1 | part of xanthane, and |
| 3.0 | parts of sodium chloride |
| | are dissolved in |
| 5.9 | parts of water. |

To this solution are added, with stirring, 90.9 parts of moist filter cake containing 56 parts of water and 44 parts of the fluorescent whitening agent of formula (300), and the formulation is homogenised with stirring.

The formulation is storage-stable at room temperature and at 40° C.

EXAMPLE 5

As in Example 1,

| | |
|---|---|
| 0.5 | part of 37% aqueous formaldehyde, and |
| 2.0 | parts of sodium carboxymethyl cellulose |
| | are dissolved in |

-continued

| | |
|---|---|
| 33.5 | parts of water. |

To this solution are added 64.5 parts of the moist filter cake containing 53.5 parts of water and 46.5 parts of the fluorescent whitening agent of formula (400)

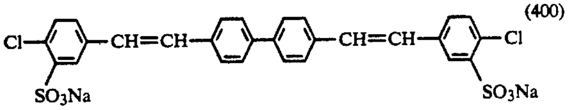

and the formulation is homogenised with stirring.

The suspension forms no deposits after standing for 3 months at room temperature.

EXAMPLE 6

As in Example 3,

| | |
|---|---|
| 0.1 | part of chloroacetamide, and |
| 0.1 | part of xanthane |
| | are dissolved in |
| 8.9 | parts of water. |

To this solution are added 90.9 parts of moist filter cake containing 56 parts of water and 44 parts of the fluorescent whitening agent of formula (300)

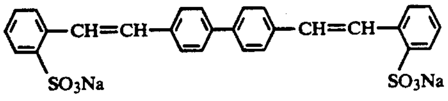

and the formulation is homogenised with stirring.

The whitener formulation is storage-stable at room temperature and at 40° C.

What is claimed is:

1. An aqueous suspension of a storage-stable whitener formulation consisting of
   a) 10 to 60% by weight, based in the total weight of the whitener formulation, of an anionic fluorescent whitening agent,
   b) 0.01 to 1% by weight, based on the total weight of the formulation, of an anionic polysaccharide, and
   c) water, and
   d) optional auxiliaries selected from the group consisting of electrolytes, preservatives and fragrances.

2. A storage-stable whitener formulation according to claim 1, which contains 15–40% by weight of fluorescent whitening agent.

3. A storage-stable whitener formulation according to claim 1, which contains 2–25% by weight of electrolyte.

4. A storage-stable whitener formulation according to claim 1, which contains a fluorescent whitening agent of formula

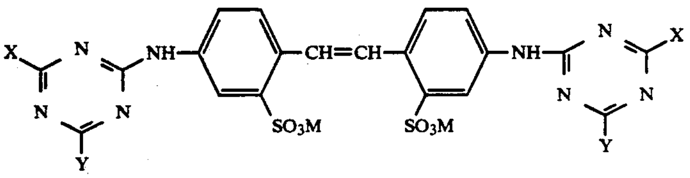
(I)

wherein X and Y may be identical or different and are a secondary or tertiary amino group or a mono-or disubstituted alkoxy group, and M is a hydrogen atom or a salt-forming cation.

5. A storage-stable whitener formulation according to claim 1, which contains a fluorescent whitening agent of formula

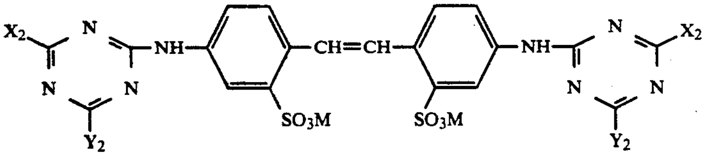
(III)

wherein $X_2$ and $Y_2$, which may be identical or different, are the phenylamino group, the morpholino group, a $C_1$–$C_4$alkylamino group which may be substituted by hydroxyl groups, and M is hydrogen or a salt-forming cation.

6. A storage-stable whitener formulation according to claim 1, which contains a fluorescent whitening agent of formula

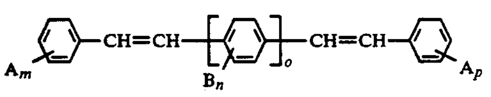
(X)

wherein A is a sulfonic acid radical, hydrogen, $C_1$–$C_4$alkyl, $C_1$–$C_4$alkoxy, or halogen, and B is hydrogen, $C_1$–$C_4$alkyl, $C_1$–$C_4$alkoxy or halogen, with the proviso that at least one substituent A is a sulfonic acid radical and m, n, o, and p are each independently of one another 1 or 2.

7. A storage-stable whitener formulation according to claim 1, which contains a fluorescent whitening agent of formula

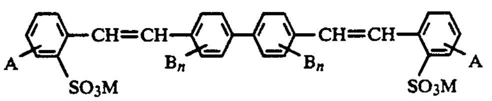
(XI)

wherein A is a sulfonic acid radical, hydrogen, $C_1$–$C_4$alkyl, $C_1$–$C_4$alkoxy or halogen, and B is a sulfonic acid radical, hydrogen, $C_1$–$C_4$alkyl, $C_1$–$C_4$alkoxy or halogen, and each n independently of the other is 1 or 2, and M is a salt-forming cation.

8. A storage-stable whitener formulation according to claim 1, which contains a fluorescent whitening agent of formula

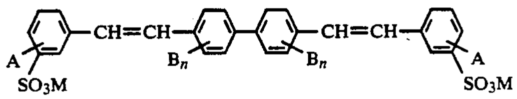
(XII)

wherein A is a sulfonic acid radical, hydrogen, $C_1$–$C_4$alkyl, $C_1$–$C_1$–$C_4$alkoxy or halogen, and B is hydrogen, $C_1$–$C_4$alkyl, $C_1$–$C_4$alkoxy or halogen, and each n independently of the other is 1 or 2, and M is a salt-forming cation.

9. A storage-stable whitener formulation according to claim 1, which contains a fluorescent whitening agent of formula

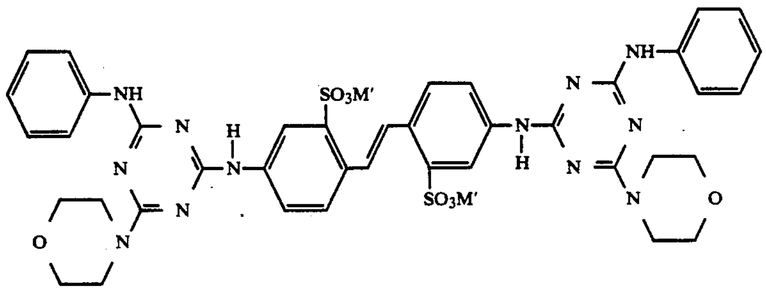
(VI)

-continued (VII)

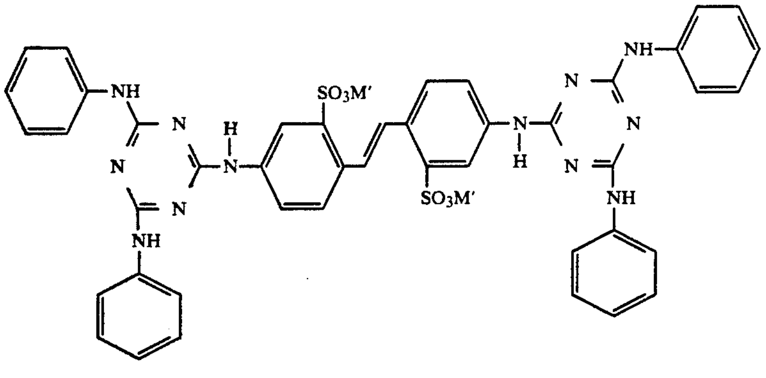

wherein M' is an alkali metal ion.

10. A storage-stable whitener formulation according to claim 1, which contains a fluorescent whitening agent of formula (XIII)

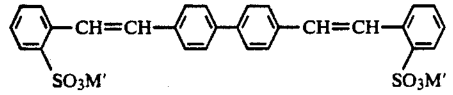

or (XIV)

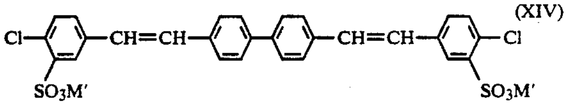

or (XV)

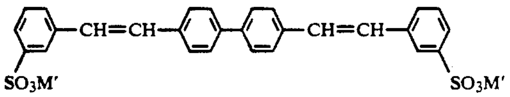

wherein M' is an alkali metal ion.

11. A storage-stable whitener formulation according to claim 1, wherein the anionic polysaccharide is xanthane.

12. A storage-stable whitener formulation according to claim 1, wherein the auxiliary is an electrolyte or a mixture of electrolytes.

13. A storage-stable whitener formulation according to claim 1, which contains 0.1-25% by weight of electrolyte.

14. A storage-stable whitener formulation according to claim 1, wherein the anionic polysaccharide is a modified polysaccharide which can be derived from cellulose.

15. A storage-stable whitener formulation according to claim 1, wherein the anionic polysaccharide is an etherified cellulose or a heteropolysaccharide having the basic structure of cellulose.

16. A storage-stable whitener formulation according to claim 1, consisting of a) 10 to 60% by weight, based on the total weight of the formulation, of an anionic fluorescent whitening agent of formula (VI)

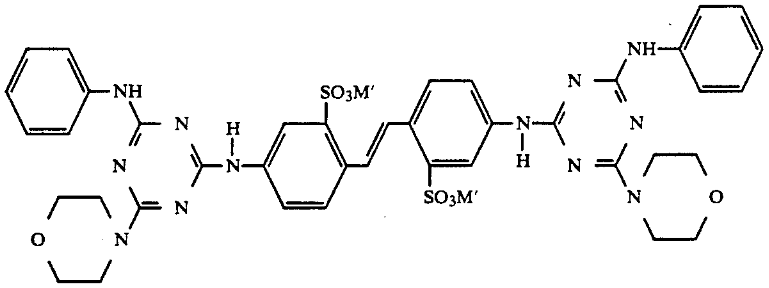

(VII)

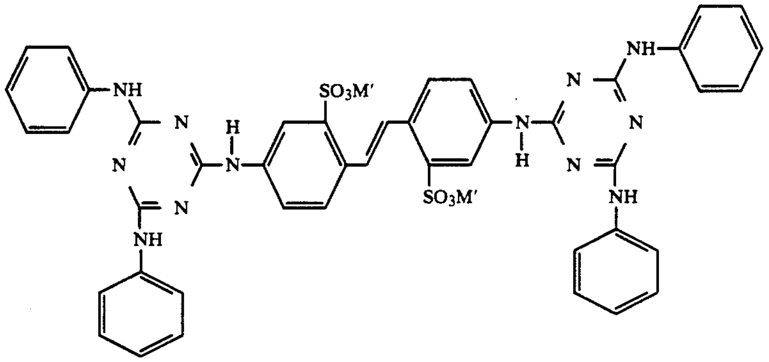

wherein M' is an alkali metal ion, b) 0.01 to 1% by weight of xanthane, based on the total weight of the formulation, c) water, d) 0.1 to 25% by weight, based on the total weight of the formulation, of an electrolyte or a mixture of electrolytes, and e) optional auxiliaries selected from the group consisting of preservatives and fragrances.

17. A storage-stable whitener formulation according to claim 1, consisting of a) 10 to 60% by weight, based on the total weight of the formulation, of an anionic fluorescent whitening agent of formula

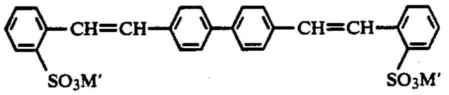
(XIII)

or

-continued

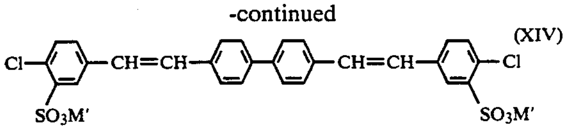
(XIV)

or

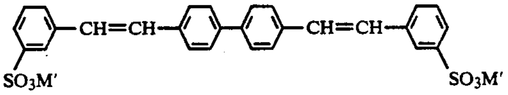
(XV)

wherein M' is an alkali metal ion, b) 0.01 to 1% by weight of xanthane, based on the total weight of the formulation, c) water, d) 0.1 to 25% by weight, based on the total weight of the formulation, of an electrolyte or a mixture of electrolytes, and e) optional auxiliaries selected from the group consisting of preservatives and fragrances.

18. A method of preparing a detergent composition which comprises mixing an effective amount of a whitener formulation of claim 1 with a detergent suspension or a surfactant suspension.

19. A storage-stable whitener formulation of claim 1 wherein the anionic polysaccharide is carboxymethyl cellulose.

* * * * *